(12) United States Patent
Auxerre

(10) Patent No.: US 6,443,204 B1
(45) Date of Patent: Sep. 3, 2002

(54) TIRE BEAD WITH CIRCUMFERENTIAL REINFORCEMENT ELEMENTS

(75) Inventor: Pascal Auxerre, Royat (FR)

(73) Assignee: Compagnie Générale des Etablissements Michelin-Michelin & Cie, Clermont-Ferrand Cedex (FR)

( * ) Notice: Subject to any disclaimer, the term of this patent is extended or adjusted under 35 U.S.C. 154(b) by 53 days.

(21) Appl. No.: 09/614,626

(22) Filed: Jul. 12, 2000

Related U.S. Application Data

(63) Continuation of application No. PCT/EP98/08263, filed on Dec. 16, 1998.

(30) Foreign Application Priority Data

Jan. 12, 1998 (FR) .............................. 98 00290

(51) Int. Cl.$^7$ ...................... B60C 15/00; B60C 15/04; B60C 15/06
(52) U.S. Cl. ................. 152/540; 152/539; 152/542; 152/543
(58) Field of Search ............... 152/539, 542, 152/543, 540

(56) References Cited

U.S. PATENT DOCUMENTS

| | | |
|---|---|---|
| 4,342,353 A | 8/1982 | Tamura et al. |
| 5,181,978 A | 1/1993 | Ochiai |

FOREIGN PATENT DOCUMENTS

| | | |
|---|---|---|
| EP | 0724973 | 8/1996 |
| FR | 750726 | 8/1933 |
| FR | 1169474 | 12/1958 |
| FR | 1234995 | 5/1960 |
| FR | 1256432 | 2/1961 |
| FR | 2055988 | 5/1971 |
| FR | 2415016 | 8/1979 |
| GB | 2016385 | 9/1979 |

OTHER PUBLICATIONS

Patent Abstracts of Japan, JP 04 260806, Sumimoto Rubber Ind Ltd, Tubeless Radial Tire for Heavy Load, Sep. 16, 1992. Abstract.
Patent Abstracts of Japan , JP 59 109406, The Yokohama Rubber Co. Ltd, Pneumatic Radial Tyre for Heavy Load, Jun. 25, 1984, Abstract.
Patent Abstracts of Japan, JP 63 008006, The Yokohama Rubber Co. Ltd, Radial Tyre for Small Truck, Jan. 13, 1988, Abstract.

*Primary Examiner*—Adrienne C. Johnstone
(74) *Attorney, Agent, or Firm*—Baker Botts L.L.P.

(57) ABSTRACT

A tire has at least one radial carcass reinforcement anchored within each bead B to at least one bead wire to form an upturn, wherein the carcass reinforcement meridian profile trace between a point A of greatest axial width and a point of tangency T with the circle circumscribed on the coating layer of the anchoring bead wire is convex over its entire length, and the thickness $\epsilon$ of the bead B, measured on a line perpendicular to the meridian profile at a point C of height $h_c$ of between 30 and 40 mm and measured to the base YY', is between 2.5 and 3.0 times the thickness e of the sidewall measured on a straight line D" of greatest axial width, an additional reinforcement armature of at least one ply of circumferential reinforcement elements being arranged axially to the inside of the carcass reinforcement non-upturned part.

7 Claims, 3 Drawing Sheets

TIRE BEAD WITH CIRCUMFERENTIAL REINFORCEMENT ELEMENTS

This is a continuation of PCT/EP98/08263, filed Dec. 16, 1998 now WO 99/34991 A1.

BACKGROUND OF INVENTION

The present invention relates to a tire with radial carcass reinforcement which is intended to bear heavy loads, and more particularly to a "heavy-vehicle"-type tire, intended to be fitted on vehicles such as, for example, lorries, road tractors, buses, trailers and others, and more particularly to the novel reinforcement structure for the beads of said tire.

Generally, a tire of the type in question comprises a carcass reinforcement formed of at least one ply of metal cables, which is anchored in each bead to at least one bead wire, forming an upturn. The carcass reinforcement is radially surmounted by a crown reinforcement, composed of at least two plies of metal cables which are crossed from one ply to the next, forming angles of between 10° and 45° with the circumferential direction. The carcass reinforcement upturns are generally reinforced by at least one bead reinforcement ply formed of metal cables which are oriented at a small angle relative to the circumferential direction, generally of between 10° and 30°.

In the case of the presence of a single bead reinforcement ply, the latter is generally located axially to the outside, along the carcass reinforcement upturn, with a radially upper end located above or below the radially upper end of the carcass reinforcement upturn. As for the radially lower end of such a reinforcement ply, it is generally located on a straight line parallel to the axis of rotation and passing approximately through the center of gravity of the meridian section of the anchoring bead wire of the carcass reinforcement.

The known solution aims to avoid deradialization of the cables of the carcass reinforcement upturn and to minimize the radial and circumferential deformations to which the end of said upturn and the outer rubber layer covering the bead and providing the connection to the rim are subjected.

The life of "heavy-vehicle" tires, owing to the progress achieved, and to the fact that certain types of travel are made less of a handicap as far as wear of the tread is concerned, has become such that it is also necessary to improve the endurance of the beads. Said improvement must focus on the degradation of the rubber layers at the level of the ends of the carcass reinforcement upturn and the radially outer ends of the bead reinforcement plies. More particularly in the case of tires which are subject to prolonged travel, which travel frequently induces a high temperature of the beads, owing to the temperatures which the mounting rims reach, the rubber mixes in contact with the rim are then subject to a reduction in their rigidity, and to more or less slow oxidation, hence the very marked tendency of the carcass reinforcement to unwind from around the bead wire under the action of the internal inflation pressure, despite the presence of one or more bead reinforcement plies. There then arise bead wire movements and shearing deformations at all the ends of the plies, resulting in the destruction of the bead. Said improvement must also, and primarily, focus on this second possibility of degradation.

The carcass reinforcement of a radial tire, mounted on its operating rim and inflated to the recommended pressure, has in one sidewall a regularly convex meridian profile between approximately the zones of connection with the meridian profile of the crown reinforcement and with the bead. In particular, starting from the radius where the carcass reinforcement is subject to the influence of the bead reinforcement ply (plies), said reinforcement has a meridian profile which is substantially rectilinear or even curved in the opposite direction to the curvature in the sidewalls, that is to say, substantially parallel to the curvature of the rim flanges starting from a point of inflection located radially approximately at the level of the radially upper end of the bead reinforcement ply which is placed along the carcass reinforcement upturn. Such an architecture results in relatively thick tire beads.

The problems of endurance referred to above, which are influenced by the operating temperature of the beads, have been solved to a very slight degree by a highly reinforced bead structure. French Patent 2 654 988 describes a tire, particularly suitable for heavy vehicles, having a radial carcass reinforcement which is formed of inextensible reinforcement elements and anchored within each bead. Said bead is reinforced by two plies of steel cables, a first ply turned up about the bead wire to form two strands, and a second ply arranged axially to the inside of the main part of the carcass reinforcement. Said problems can also be solved by what is called a "thinned" bead structure, obtained, for example, by the means described in French Patent 2 415 016 which, to this end, teaches to impart a relatively great concavity to the outer sidewall of the tire, between the point where said sidewall is no longer in contact with the rim and the point where said sidewall achieves its maximum distance relative to the equatorial plane, when the tire is mounted on its operating rim and inflated to the recommended pressure.

Such an arrangement becomes insufficient, in particular when the ratio of the height H on the rim to the maximum axial width S of the tire decreases, and requires improvement when the loads borne become greater, or the inflation pressures less, than the recommended loads and pressures.

Research has led to the conclusion that the thinning of the beads had to be effected not from the outside of the tire but from the inside, and that it needed to be effected in combination with specific reinforcement characteristics of said beads.

SUMMARY OF THE INVENTION

In order to improve the endurance of the beads of a tire, for a vehicle intended to bear heavy loads, said tire, according to the invention, comprises at least one radial carcass reinforcement which is formed of at least one ply of inextensible reinforcement elements and is anchored within each bead B to at least one bead wire to form an upturn, each bead B being reinforced by an additional reinforcement armature formed of metal elements. It is characterized in that, viewed in meridian section, the carcass reinforcement has a meridian profile, the trace of which between the point A of greatest axial width and the first point of tangency T with the virtually circular coating layer of the anchoring bead wire, is convex over its entire length, and such that the thickness $\epsilon$ of the bead B, measured on a line perpendicular to said meridian profile at a point C of height $h_c$ of between 30 and 40 mm and measured relative to the base of the bead YY', is between 2.5 and 3.0 times the thickness e of the sidewall measured on the straight line D", which is the line of greatest axial width, said carcass reinforcement being reinforced, in its non-upturned part, by the additional reinforcement armature formed of at least one ply of circumferential reinforcement elements which is arranged axially to the inside of said non-upturned part.

The point A of greatest axial width is, by definition, the point of the meridian profile of the carcass reinforcement corresponding to the point of greatest axial width of the carcass reinforcement when the tire is mounted on its operating rim, non-loaded and inflated to the recommended pressure, and the straight line D" of greatest axial width is the straight line parallel to the axis of rotation and passing through A.

The elements of the additional reinforcement armature are said to be circumferential if the angle which they form with the circumferential direction is between +5° and −5°.

The convex trace of the meridian profile of the carcass reinforcement is generally formed of a plurality of adjacent arcs of a circle, the radii of curvature of which increase from the point A of greatest axial width to the point of tangency T with the virtually circular coating layer of the anchoring bead wire, but the trace between the point A and the point T may be convex and circular with a center of curvature located on the straight line of greatest axial width.

The ply or plies of the additional reinforcement armature, axially to the inside of the non-upturned part of the carcass reinforcement, will advantageously have its (their) radially lower end(s) radially below the straight line D', parallel to the axis of rotation and passing through that point of the coating layer of the anchoring bead wire which is radially farthest from the axis of rotation, but above the straight line D which is parallel to the axis of rotation and passes through that point of the coating layer of the anchoring bead wire which is radially closest to the axis of rotation, and radially upper ends located at a radial distance from the straight line D between a quantity equal to half the radial distance between the straight lines D and D", increased by half the radial distance between the straight lines D and D', and a quantity equal to half the radial distance between the straight lines D and D", reduced by half the radial distance between the straight lines D and D'.

This structure thus permits partial takeup of the meridian tensile forces to which the carcass reinforcement is subjected, and thus minimizes the radial deformations at the ends of the carcass reinforcement upturn, whatever the conditions of travel.

The takeup of the forces will be all the greater the greater the number of reinforcement elements of the additional armature; they will preferably be metal, made of steel, which are parallel to each other within the additional ply and adjoining over the entire width of the reinforcement armature. Reinforcement elements are said to be adjoining if, in the direction perpendicular to said elements, the distance between two adjacent elements is reduced as much as possible.

The takeup of the meridian tensile forces of a carcass reinforcement is known per se from numerous documents. French Patent 750 726 teaches gluing carcass reinforcement plies to auxiliary reinforcements, each formed of a cord wound in a spiral and consequently having significant flexibility in the transverse direction. Said gluing is effected such that two carcass reinforcement plies tightly surround an auxiliary reinforcement, this surrounding being in the absence of a bead wire and a carcass reinforcement upturn.

French Patent 1 169 474 also teaches dispensing with the bead wire usually used by small plies of metal cords or cables inclined on the parallel hooking line, the angle of inclination possibly being as low as 5°, the carcass reinforcement ply (plies) being turned up or not turned up.

French Patent 1 234 995 provides for the replacement of the usually oblique reinforcement elements of the bead reinforcement ply (plies) which is (are) intended to reduce the movements of hooking against the rim flange with circumferential elements, the reinforcement armature possibly being arranged between the main part of the carcass reinforcement and the upturn of said reinforcement, or axially to the outside of said carcass reinforcement upturn.

The same bead reinforcement armatures with circumferential elements are found in French Patent 1 256 432, said elements being intended to take up the tensile forces of the carcass reinforcement in their entirety, and in the case of tires for passenger vehicles, in the absence of anchoring bead wires or any other reinforcement ply.

FR 2 055 988 describes a certain number of possible applications of a bead reinforcement armature having circumferential elements, in particular the use of such an armature in the place of the conventional armature having oblique elements which are arranged axially to the outside of the carcass reinforcement upturn.

Not only does the combination of the meridian profile according to the invention with the presence of a bead reinforcement armature, having circumferential elements, and at least one ply of which is arranged within the non-upturned part or main part of the carcass reinforcement, permit improvement of the endurance of the beads, but it also makes it possible to obtain a very substantial reduction in the weight of a tire while not adversely affecting its properties, when the presence of a bead reinforcement armature described above is combined with replacing the bead wire having rectangular metal wires which is generally used in the type of tire in question with a more economical bead wire of the braided type, that is to say, one formed of helical braiding of several metal wires, or a bead wire of the type having a stack of polygonal section, that is to say, a bead wire obtained by winding a metal wire on a form, resulting in several layers of different widths. The types of bead wire above mean that less space is taken up, owing to the form of their cross-section, but also owing to the fact that the takeup of the forces by the additional armature permits a substantial reduction in said sections. Whatever the type of bead wire, whether braided or in a stack, the cross-section may be reduced by 30 to 50% which, relative to the invention being applied to the case of a bead wire having rectangular wires, which takes up more space, results in having either a thinner thickness of bead, or a thickness of bead which is constant but has a meridian profile which is said to be flatter, in the sense that its convexity is less pronounced.

The bead reinforcement armature thus described may be produced separately by spiral winding on a horizontal support of suitable shape, and then be transferred to the non-vulcanized tire blank. The manufacture of such a tire will however be advantageously facilitated by the use as reinforcement elements of lengths or assemblies or groups of lengths of cables of a circumferential length of between 0.2 and 0.4 times the average circumferential length of the reinforcement armature, which permits laying of the bead reinforcement armature on the building drum for the raw blank of the carcass reinforcement and the shaping of said blank into a torus without major difficulties, and said average length being measured upon laying on said building drum. The circumferential gaps or cuts between cut elements will preferably be offset from each other.

It may also be advantageous, in order to impart greater transverse rigidity to the tire bead, while permitting greater improvement of the endurance of the beads, for at least one ply formed of circumferential metal elements and arranged axially to the outside of the non-upturned part of the carcass reinforcement to be present in the additional reinforcement armature. Said additional ply, axially to the outside, will have its radially upper end located radially in the same manner as the ply or plies axially to the inside, whereas the radially lower end of this second ply will advantageously be located between the straight line D' and a straight line parallel to D' radially to the outside and radially distant from D' by an amount equal to the radial distance between D' and D. The reinforcement elements of said second ply will preferably be lengths or assemblies of lengths of metal cables made of steel, of a circumferential length at most equal to 0.4 times the average circumferential length of the reinforcement armature thus formed.

DESCRIPTION OF THE DRAWINGS

The characteristics of the invention will be better understood with reference to the following description, which refers to the drawings, which illustrate examples of embodiments in non-limitative manner, and in which.

DESCRIPTION OF PREFERRED EMBODIMENTS

Figure 1:
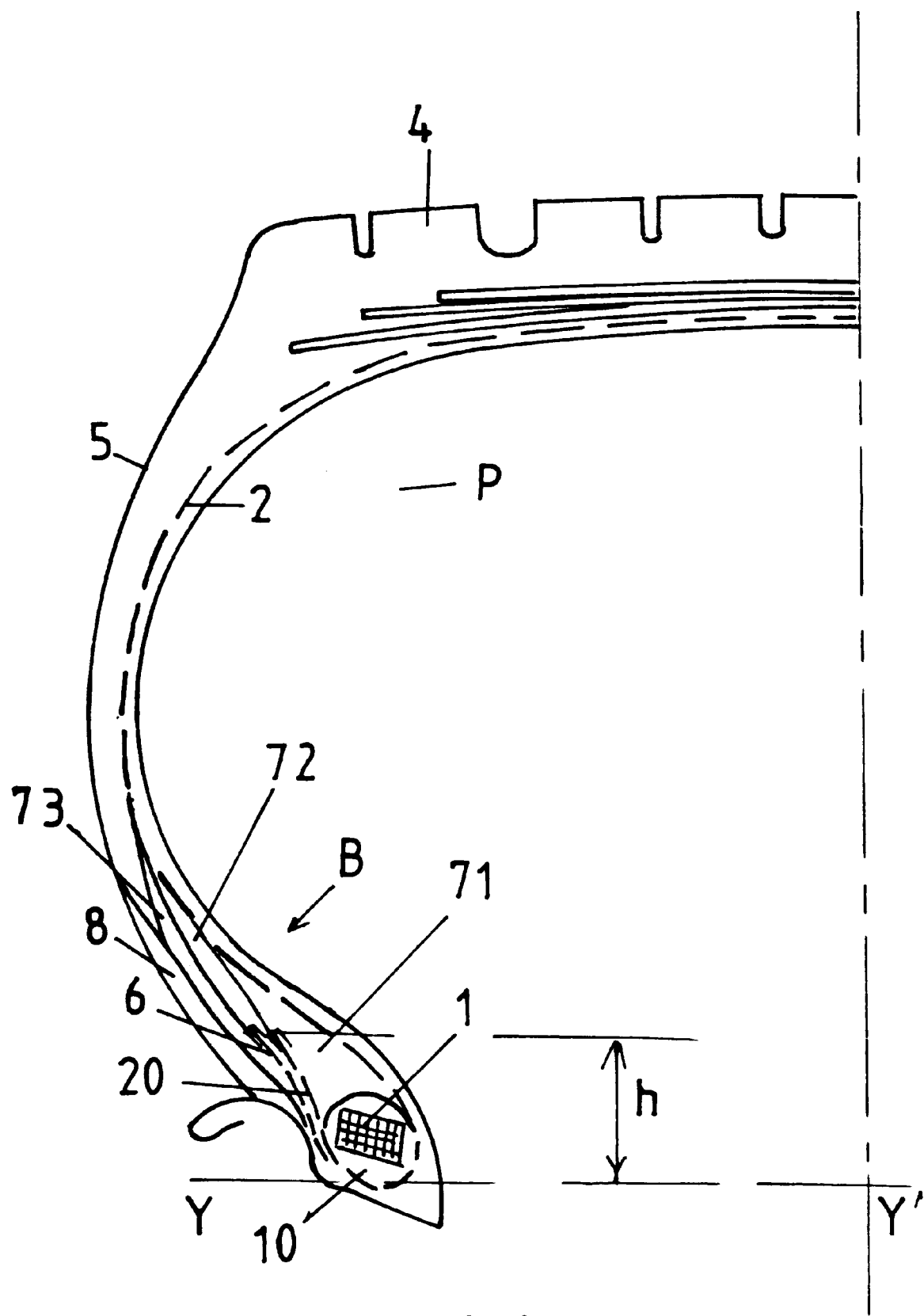
FIG. 1 is a diagram, viewed in cross-section, of a tire structure known from the prior art.

The tire P shown in FIG. 1 is a tire of dimension 315/80 R 22.5, which is intended to be mounted on a rim comprising rim seats inclined at 15°. Said tire comprises a tread 4 joined to two beads B by means of two sidewalls 5. Each bead B is reinforced by a bead wire 1 formed by winding a cord of quadrilateral section on a suitable form until a plurality of radially juxtaposed rows of cords is obtained. Around said bead wire 1 there is anchored a carcass reinforcement 2, composed of a single ply of metal cables. The carcass reinforcement is anchored by an upturn 20 around the layer 10 of rubber mix which covers the bead wire 1, the radial distance h between the radially upper end of said upturn 20 and the straight line YY' parallel to the axis of rotation and defining the nominal diameter of the bead (which, in the case described, is the same as the diameter of the operating rim) being equal, in the example in question of the tire of dimension 315/80 R 22.5, to 37 mm. Between the carcass reinforcement 2 and its upturn 20, radially above the bead wire 1, there is arranged a bead filler 71 of rubber mix of a generally high Shore hardness. Axially to the outside of the upturn 20 there is a reinforcement ply 6 formed of inextensible metal cables slightly oriented relative to the circumferential direction, and the radially upper end of which is farther from the axis of rotation than the upper end of the upturn 20 of the carcass reinforcement 2. Said ply 6 is separated from the bead filler 71 by a second fill-in filler 72, and from the protective rubber mix 8, which surrounds the bead B, by a profiled member of rubber mix 73.

Figure 2:
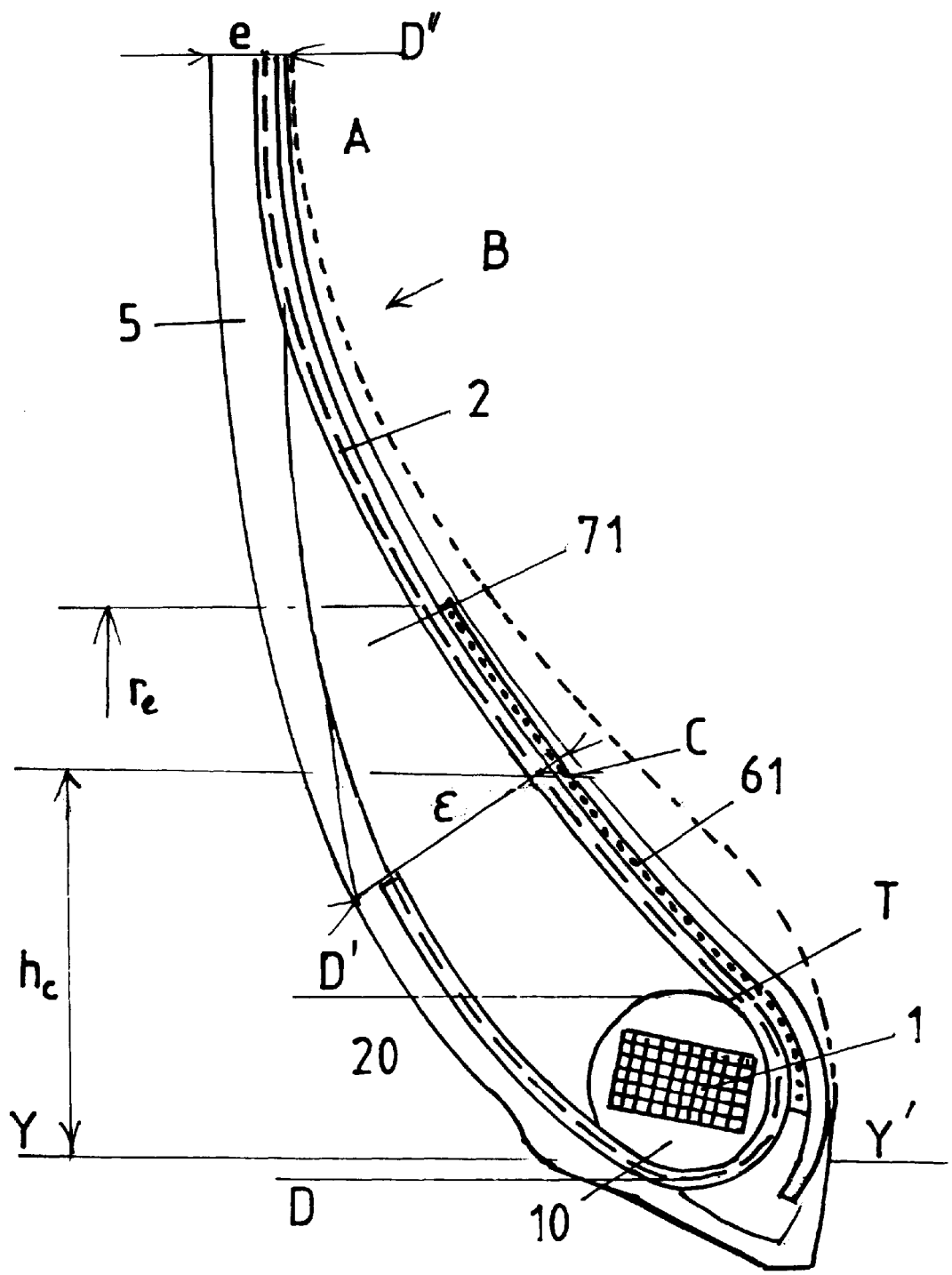
FIG. 2 is a diagram, in an enlarged view, of a first variant of a bead according to the invention, in its most pared-down version.

The bead B of the tire of the same dimension, according to the invention and illustrated in FIG. 2, is identically reinforced by a bead wire 1 having rectangular wires, and surrounded by a layer 10 of rubber mix having a high modulus of elongation, around which is anchored the carcass reinforcement 2 to form an upturn 20. Said bead B has the following two essential characteristics, in combination: the carcass reinforcement 2, viewed in meridian section, has a meridian profile, between the point A of greatest axial width and the first point of tangency T of said profile with the virtually circular coating layer 10 of the bead wire 1, which is continuously convex, and the bead reinforcement armature 6, composed, in the example described, of a single ply 6 of circumferential elements, is placed axially to the inside of the non-upturned part of the carcass reinforcement 2 and non-axially to the outside of the upturn 20 of the carcass reinforcement. The convexity of the meridian profile, which is continuous from point A to point T, makes it possible, relative to the tire of the prior art having a profile trace which passes from convex to concave, to thin the bead B not insignificantly. If we consider the thickness $\epsilon$ of the bead as being the distance, measured on a line perpendicular to the meridian profile of the carcass reinforcement lowered by the point C of said meridian profile of height $h_c$, of between 30 and 40 mm and measured relative to the straight line YY', the bead according to the invention has a thickness equal to 2.9 times the thickness e of the sidewall, measured on the straight line D" parallel to the axis of rotation which is of greatest axial width, whereas the bead B of the tire of FIG. 1 has a thickness, measured under the same conditions, equal to 3.4 times the thickness e. Said thinning, which is illustrated in FIG. 2 by the difference in the traces of the inner sidewalls of a tire of the prior art and a tire according to the invention, respectively, can only yield satisfactory results if the bead B is reinforced by at least one additional reinforcement ply 61 of elements having a high elasticity modulus and arranged circumferentially, said ply 61 being located axially to the inside of the carcass reinforcement 2, the meridian profile of which is convex. The reinforcement elements of the ply 61 are lengths of metal 27×23 cables, the length of said elements or lengths of cables being equal to one quarter of the circumferential length of said ply 61, measured when it is laid on the building drum for the carcass reinforcement blank. The spaces between the ends of the elements are of low amplitude: 3 mm (also measured during laying) and are circumferentially offset from each other.

The radially lower end of the ply 61 is substantially arranged on a straight line parallel to the axis of rotation and passing through that point of the bead wire 1 which is closest to the axis of rotation, which point is located at a distance of 290 mm from the axis of rotation which lies between the distance of 280 mm between the axis of rotation and the straight line D passing through that point of the coating layer 10 of the anchoring bead wire 1 which is closest to the axis of rotation and the distance of 305 mm between the axis of rotation and the straight line D' passing through that point of the coating layer 10 which is farthest from said axis of rotation.

As for the radially upper end, it is located radially, in the case described, at a distance re from the axis of rotation equal to 335 mm, which quantity lies between a quantity of 357.5 mm, which is equal to half the total of 345 mm of the respective distances of the straight lines D and D" from the axis of rotation (410+280)/2, the straight line D" of greatest axial width passing through the point A being 410 mm from the axis of rotation, increased by half the radial distance of 12.5 mm between the straight lines D and D' (305−280)/2, and a quantity of 332.5 mm, which is equal to half the total 345 mm of the respective distances of the straight lines D and D" from the axis of rotation, reduced by half the radial distance of 12.5 mm between the straight lines D and D'. The bead B is completed by a single filler 71 radially above the bead wire 1, and by a protective layer 8.

Figure 3:
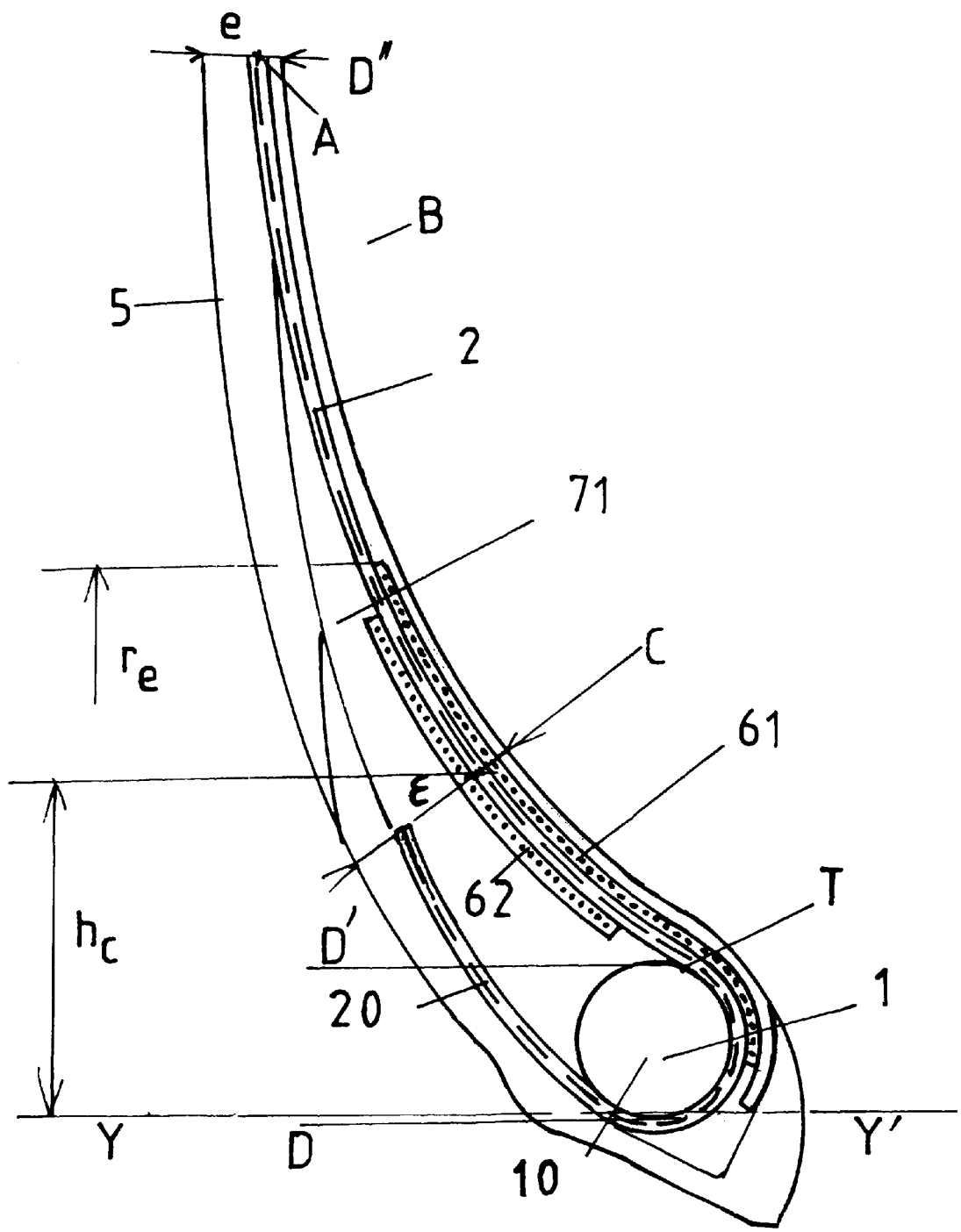
FIG. 3 is a diagram of a second variant of a bead according to the invention, the bead wire being a braided bead wire, and with a bead reinforcement armature having two plies.

The bead B shown in FIG. 3 differs from that shown in FIG. 2, firstly by the fact that the anchoring bead wire 1 of the carcass reinforcement 2 is a bead wire of "braided" type (it could be of the "stack" type), which permits a saving in weight and means that less space is taken up, while retaining a substantially constant effective bead wire cross section, and a reduction in the cost price of the tire, and secondly by the fact that the additional bead reinforcement armature 6 comprises two plies 61 and 62 of cut reinforcement elements. If the bead of FIG. 3, and in particular the respective meridian profiles of the carcass reinforcement, is compared with that of FIG. 2, it is clearly visible that the thickness $\epsilon$ of the bead, a distance which is always measured on the perpendicular to the meridian profile of the carcass reinforcement lowered by the same point C of said meridian profile, is less, and is equal in this example to 2.5 times the thickness e of the sidewall of 8.9 mm, measured on the straight line D" parallel to the axis of rotation and of greatest axial width.

The first additional reinforcement ply 61, as above, is axially to the inside of the convex profile of the non-upturned part of the carcass reinforcement 2, whereas the second ply 62 is axially to the outside of said profile. The radial continuity of the rigidities of this part of the tire is ensured by the non-alignment of the respective ends of the two plies 61 and 62, the ends of the first ply 61 remaining within the limits previously defined; however, the radially upper end of the second ply 62 is radially located below the radially upper end of the first ply 61, whereas the radially lower end of the second ply 62 is very slightly above the straight line D'.

Tires $P_C$ in accordance with the invention, as described in the passage of the description corresponding to FIG. 2, were compared:

with conventional tires $P_T$, that is to say, ones comprising beads of conventional thickness, and in which the bead reinforcement ply is a ply of continuous metal cables oriented at 22° to the circumferential direction and arranged axially to the outside of the carcass reinforcement upturn, as shown in FIG. 1 of the drawings, and with tires $P_A$, comprising beads of normal thickness, but with a bead reinforcement ply positioned axially to the inside of the carcass reinforcement and formed of the same lengths of cables, oriented circumferentially, and with tires $P_B$ comprising beads of reduced thickness with a bead reinforcement ply arranged axially to the outside of the carcass reinforcement upturn, and formed of continuous metal cables oriented at an angle of 22° to the circumferential direction.

The comparison was made based on two quality criteria which are fundamental to the endurance of tire beads: endurance under excess load, and endurance on a heated rim. Under the same rolling conditions for all the tires tested, the conventional tires $P_T$ on average (2 tires tested per category) covered 53,000 km traveling under excess load and 5,200 km traveling with a heated rim. The tires $P_A$ covered 101,000 km and 8,100 km respectively, whereas the tires $P_B$ covered 32,000 km and 3,300 km respectively, and the tires $P_C$, which were in accordance with the invention, covered 105,000 km and 8,200 km. The above results perfectly bring out the beneficial effect of replacing the reinforcement armature of angled elements on the carcass reinforcement upturn with a reinforcement armature of discontinuous circumferential elements axially to the inside of the main part of the carcass reinforcement. Moreover, said results bring out the obvious synergistic effect existing between the two parameters thickness of the bead and judicious selection of the structure and position of the bead reinforcement armature: for example when traveling on a heated rim, if the reinforcement armature having discontinuous circumferential cables which is placed within the carcass reinforcement permits an average gain of 2,900 km in the case of a bead of conventional thickness, the same change permits a gain of 4,900 km in the case of a thinned bead. The same applies to the results of traveling under excess load: the change in reinforcement armature causes a gain of 48,000 km in the case of a bead of conventional thickness, whereas the same change causes a gain of 73,000 km, that is to say, virtually twice as much, in the case of a thinned bead. This synergistic effect, which had not been suspected hitherto, makes it possible to impart to a tire, the beads of which have the combination of parameters described, very significantly greater endurance than what is currently known, while permitting a reduction in the total weight of the tire and a slight reduction in its cost price.

I claim:

1. A tire, comprising at least one radial carcass reinforcement which is formed of at least one ply of inextensible reinforcement elements and is anchored within each bead B to a bead wire having a virtually circular coating layer to form an upturn, each bead B being reinforced by an additional reinforcement armature of at least one ply formed of circumferential metal elements, arranged axially to the inside of the non-upturned part of said at least one carcass reinforcement, characterized in that, viewed in meridian section, the at least one carcass reinforcement has a meridian profile, the trace of which between the point A of greatest axial width and the point of tangency T with the virtually circular coating layer of the anchoring bead wire, is convex over its entire length, and such that the thickness $\gamma$ of the bead B, measured on a line perpendicular to said meridian profile at a point C of height $h_c$ of between 30 and 40 mm and measured relative to the base of the bead YY', is between 2.5 and 3.0 times the thickness e of the sidewall measured on a straight line D" of greatest axial width.

2. A tire according to claim 1, characterized in that the at least one ply of the additional reinforcement armature, axially to the inside of the non-upturned part of the at least one carcass reinforcement, has its radially lower end radially below a straight line D', parallel to the axis of rotation and passing through that point of the coating layer of the anchoring bead wire which is radially farthest from the axis of rotation, but above a straight line D which is parallel to the axis of rotation and passes through that point of the coating layer of the anchoring bead wire which is radially closest to the axis of rotation, and its radially upper end located at a radial distance from the straight line D between a quantity equal to half the radial distance between the straight lines D and D", increased by half the radial distance between the straight lines D and D', and a quantity equal to half the radial distance between the straight lines D and D", reduced by half the radial distance between the straight lines D and D'.

3. A tire according to claim 1, characterized in that the additional reinforcement armature furthermore comprises at least one ply, formed of circumferential metal elements and arranged axially to the outside of the non-upturned part of the at least one carcass reinforcement, said at least one additional ply having its radially upper end located radially in the same manner as the ply or plies axially to the inside, whereas its radially lower end is located between the straight line D' and a straight line parallel to D' radially to the outside and radially distant from D' by an amount equal to the radial distance between D' and D.

4. A tire according to claim 1, characterized in that the circumferential reinforcement elements of the additional armature are metal, made of steel, and adjoining over the entire width of said armature.

5. A tire according to claim 1, characterized in that the anchoring bead wire of the at least one carcass reinforcement is a braided bead wire.

6. A tire according to claim 1, characterized in that the reinforcement elements of the reinforcement armature are lengths or assemblies of lengths of cables, of a circumferential length of between 0.2 and 0.4 times the average circumferential length of the armature.

7. A tire according to claim 6, characterized in that gaps or cuts between circumferential lengths are offset from each other.

\* \* \* \* \*